(12) United States Patent
Bonacini

(10) Patent No.: US 6,622,636 B2
(45) Date of Patent: Sep. 23, 2003

(54) DEVICE FOR AUTOMATICALLY MOVING VEHICLES ALONG GUIDE WAYS OF LIFTS

(75) Inventor: Fabrizio Bonacini, Correggio (IT)

(73) Assignee: Giuliano S.r.l., Correggio (IT)

( * ) Notice: Subject to any disclaimer, the term of this patent is extended or adjusted under 35 U.S.C. 154(b) by 0 days.

(21) Appl. No.: 10/117,207

(22) Filed: Apr. 8, 2002

(65) Prior Publication Data

US 2002/0144623 A1 Oct. 10, 2002

(30) Foreign Application Priority Data

Apr. 9, 2001 (IT) .................................... MO2001A0065

(51) Int. Cl.⁷ ................................................ B66F 7/00
(52) U.S. Cl. ..................... 104/162; 104/172.3; 187/217
(58) Field of Search ................................ 104/162, 165, 104/172.3; 187/203, 216, 217, 221, 218, 219, 220; 414/227, 234, 239, 240, 259

(56) References Cited

U.S. PATENT DOCUMENTS

| 3,352,436 A | * | 11/1967 | Vesconte | 414/259 |
| 3,832,953 A | * | 9/1974 | Aaron | 104/162 |
| 5,322,143 A | * | 6/1994 | Curran | 187/211 |
| 5,651,319 A | * | 7/1997 | Sugahara | 104/162 |
| 5,851,098 A | * | 12/1998 | Buckenauer et al. | 414/263 |
| 5,915,500 A | * | 6/1999 | Weaver | 187/216 |
| 5,954,160 A | * | 9/1999 | Wells et al. | 187/219 |
| 6,164,414 A | * | 12/2000 | Duty | 187/210 |
| 6,257,371 B1 | * | 7/2001 | Wanner | 187/215 |
| 6,267,059 B1 | * | 7/2001 | Brandt | 104/162 |

FOREIGN PATENT DOCUMENTS

JP 54-27110 * 3/1979

* cited by examiner

*Primary Examiner*—Mark T. Le
(74) *Attorney, Agent, or Firm*—Guido Modiano; Albert Josif; Daniel O'Byrne

(57) ABSTRACT

A device for automatically moving vehicles along guide ways of lifts is constituted by a pusher carriage movable horizontally with a corresponding actuator on a guide that is longitudinally fixable to at least one of the guide ways and is provided with at least one pair of arms that are articulated thereto and rotate in a scissor-like fashion on a horizontal plane flush with the upper resting surface of the guide way, from an active position, in which they are parallel one another and adjacent to at least one wheel and lie transversely above the wheel, to an inactive position, in which they are divaricated and aligned parallel to the wheel.

20 Claims, 3 Drawing Sheets

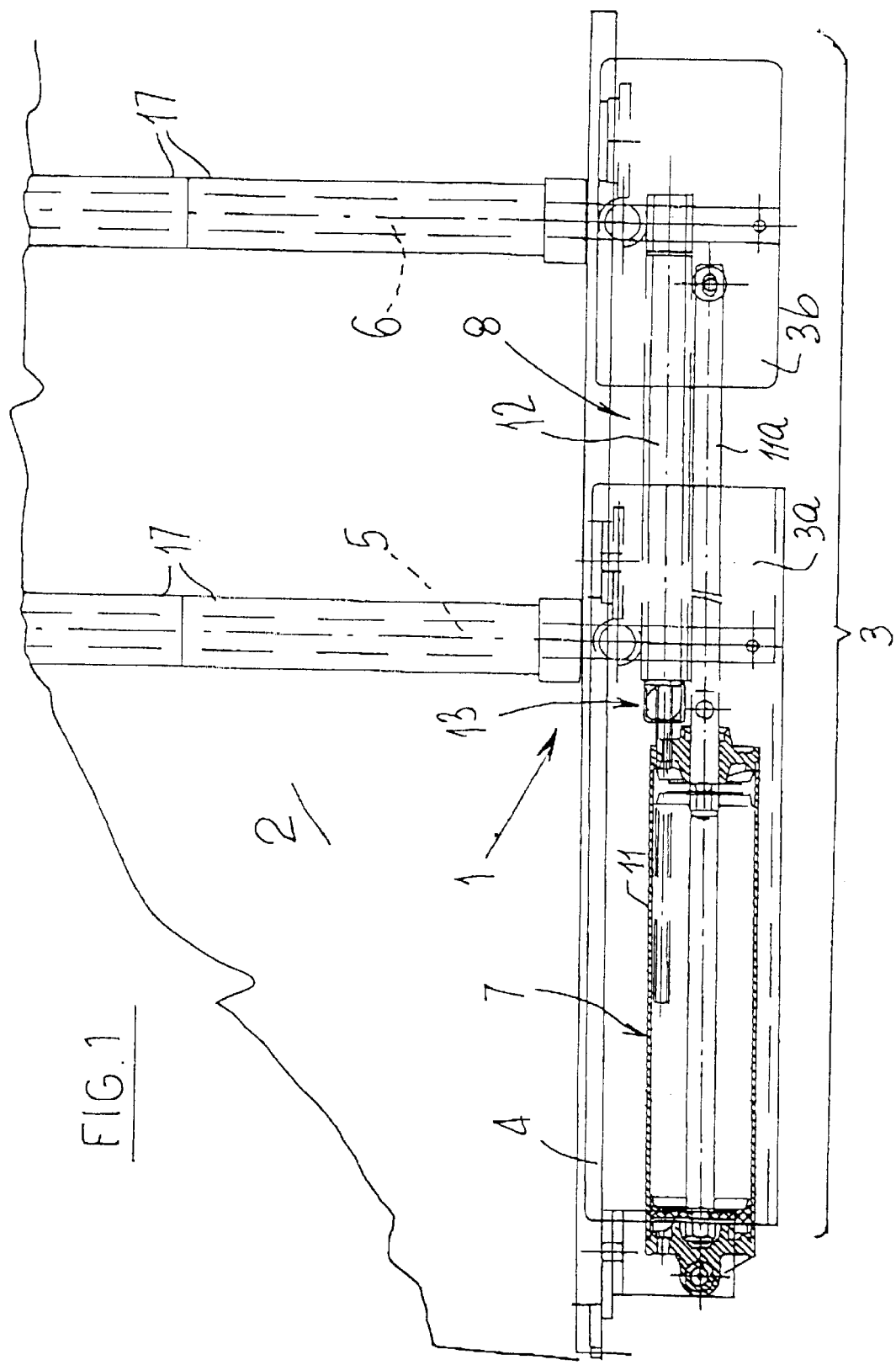

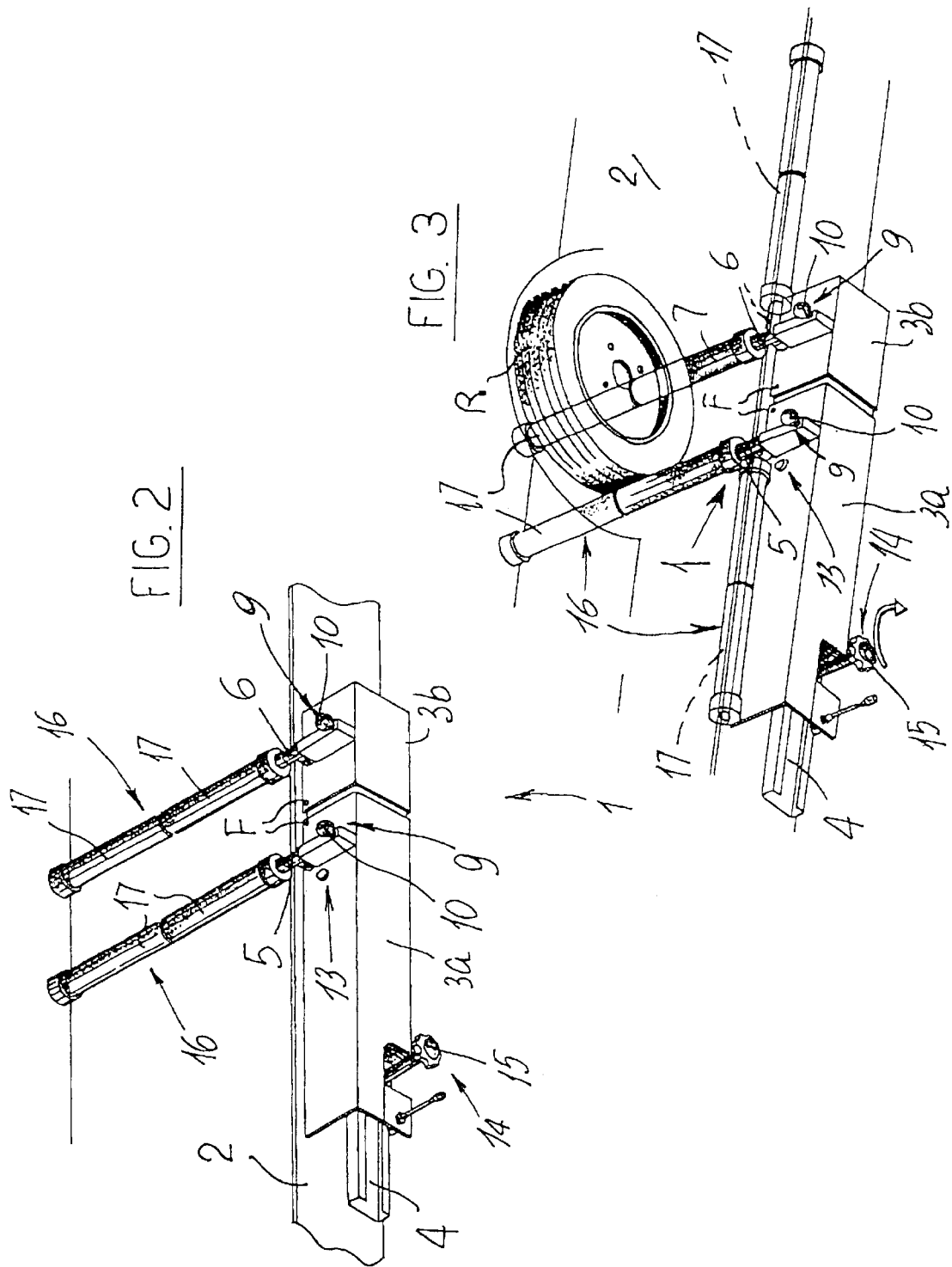

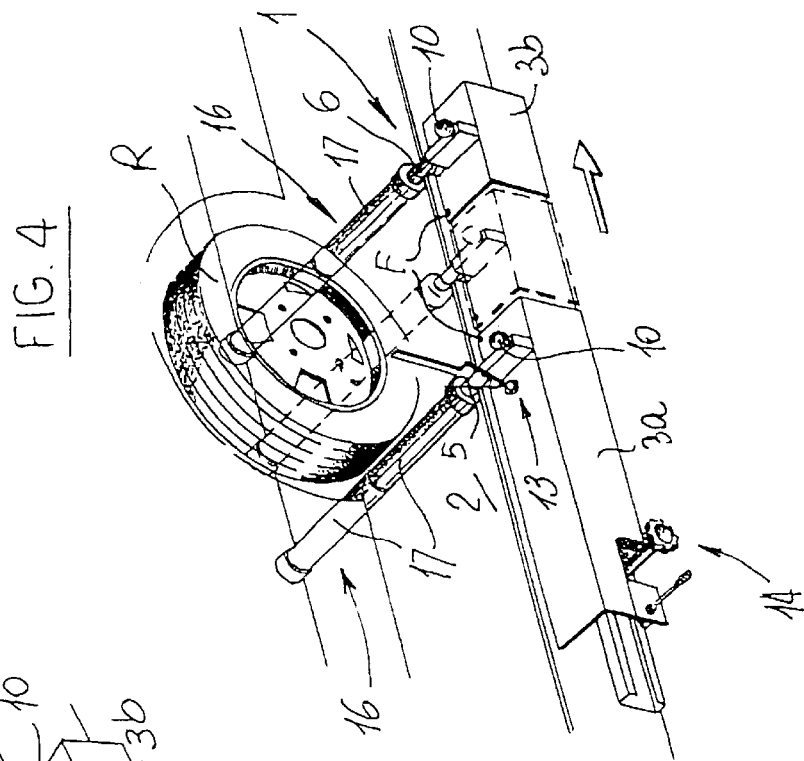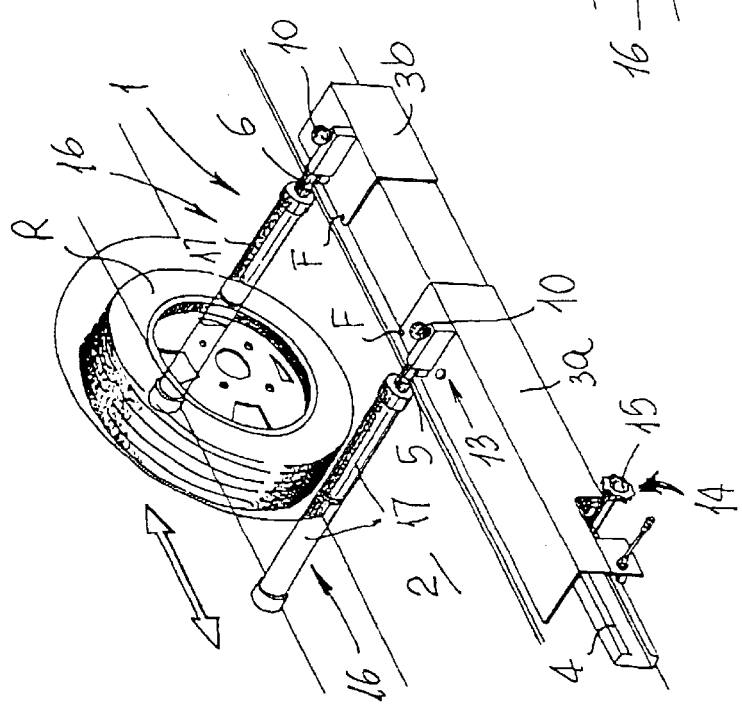

DEVICE FOR AUTOMATICALLY MOVING VEHICLES ALONG GUIDE WAYS OF LIFTS

BACKGROUND OF THE INVENTION

The present invention relates to a device for automatically moving vehicles along guide ways of lifts.

Lifts have long been used for interventions on vehicles of various kinds, which have a structure composed of two horizontal and parallel guide ways supported by a frame that moves vertically in order to lift the vehicles loaded onto said guide ways and to access the underside of said vehicles or their lower region, for example the parts linked to the wheels.

When vehicles are located on said lifts, it is often necessary to move them systematically back and forth, albeit over short distances, in order to perform the required tests.

This is the case for example when the wheel trim is checked, i.e. of the so-called toe-in.

To perform this test, after placing the vehicle on the lift, the operators actually apply the measurement instruments to the wheels of said vehicle and, in order to check their correct placement, they move said vehicle by pushing it manually along the guide ways in order to check that the orientation of the instruments does not change as the wheels turn; if it did, it would yield incorrect measurement values.

The effort to be exerted for these movements is considerable, because in the specific case the lift is in the raised position and the operator has to act upward from below.

Moreover, this effort is clearly linked to the size of the vehicle and must be repeated many times during a working day.

SUMMARY OF THE INVENTION

The aim of the present invention is to eliminate the drawbacks of the known art by providing a device for automatically moving vehicles along guide ways of lifts that allows operators to perform any necessary movement without acting manually and therefore without any effort.

Within this aim, an object of the present invention is to solve said aim with a structure that is simple and easy to provide in practice, safe in use, effective in operation, relatively low in cost and applicable both to newly manufactured lifts and to existing lifts.

This aim and this and other objects are all achieved by the present device for automatically moving vehicles along guide ways of lifts, characterized in that it is constituted by a pusher carriage that can be moved horizontally by way of corresponding means on a guide that can be fixed longitudinally to at least one of said guide ways and is provided with at least one means that clamps at least one wheel of a vehicle in the pushing configuration and retracts in the inactive configuration.

BRIEF DESCRIPTION OF THE DRAWINGS

Further characteristics and advantages of the present invention will become better apparent from the detailed description of a preferred but not exclusive embodiment of a device for automatically moving vehicles along guide ways of lifts, illustrated only by way of non-limitative example in the accompanying drawings, wherein:

FIG. 1 is a schematic enlarged-scale view of the invention;

FIG. 2 is a perspective view of the device according to the invention, applied to a guide way of a vehicle lift;

FIGS. 3 to 5 are schematic views of steps of the adaptation of the invention to the diameter of a vehicle wheel.

DESCRIPTION OF THE PREFERRED EMBODIMENTS

With reference to the figures, the reference numeral 1 generally designates a device for automatically moving vehicles along the guide ways 2 of lifts.

The device 1 is constituted by a pusher carriage 3, which is mounted so that it can be moved horizontally on a guide 4, which can in turn be fixed longitudinally on one side, preferably the outer side, of at least one of the guide ways 2 and is provided with a means for clamping at least one wheel R of a vehicle; said clamping means is constituted by at least one pair of arms 5 and 6, which are articulated to said means so that they rotate in a scissor-like fashion on a horizontal plane, substantially flush with the upper resting surface of the guide way 2, between an active position, in which they are adjacent to one of the wheels R of a vehicle and are parallel one another transversely to said wheel, and an inactive position, in which they are divaricated one another and aligned parallel to the guide way 2, so as not to interfere with the wheels of the vehicle.

The carriage 3 can move along the guide way 4 by way of the action of means 7, and is composed of two contiguous sections 3a and 3b, between which means 8 for mutual approach or spacing are interposed.

Each arm 5 and 6 is articulated to its own section of the carriage 3, i.e., the arm 5 is articulated to the section 3a and the arm 6 is articulated to the section 3b.

Means 9 for removable locking of said arms when they are in their extreme active or inactive positions are provided between said arms 5 and 6 and the respective sections of the carriage 3.

The locking means 9 are constituted, for each arm, by a pawl 10, which is mounted on said arm and can elastically engage alternately at least two corresponding positioning holes F formed in the respective section of the carriage 3.

The means 7 for moving the carriage 3 along the guide way 4 are constituted by at least one pneumatic or hydraulic actuator 11, in which the body is rigidly coupled to the guide way 4 and the end of the stem 11a is rigidly coupled to the section 3b of the carriage 3.

The means 8 for moving the sections 3a and 3b of the carriage 3 mutually closer or further apart are constituted by at least one bar 12, which is rigidly coupled to one of said sections, for example the section 3b, and is directed toward the other section 3a so as to be parallel to the guide way 2; a sleeve, not shown in the drawings and in which the bar 12 can be inserted slidingly, and a corresponding sliding blocking element 13 are mounted on said section 3a.

Advantageously, the bar 12 is of the peripherally toothed or threaded type, and in the preferred embodiment of the invention the block 13 is of the type technically known as "choker", i.e., it has a guillotine that can engage transversely the peripheral teeth or threads of the bar 12.

The section 3a of the carriage also has means 14 for locking its position along the guide 4; said means 14 are constituted by at least one knob 15, which can be screwed into a threaded hole, which is not shown in the drawings, is formed correspondingly and transversely in said section 3a of the carriage 3 and can engage the guide 4 by forced contact.

Both arms 5 and 6 support means 16 for free rotation, for contact with at least one of the wheels R of a vehicle placed on the lift; said means are constituted by rollers 17, which are fitted coaxially on the arms 5 and 6 and whose longitudinal sliding is locked thereon so that they cannot slip off accidentally.

The operation of the invention can be deduced intuitively from the above description, and is as follows: a vehicle is loaded onto the lift, with the arms 5 and 6 arranged in a mutually divaricated configuration, i.e., parallel to the side of the guide way 2 to which the device 1 is applied and practically aligned coaxially to each other, and retained in this position by the engagement of the pawls 9 in the respective holes F.

When the vehicle is positioned on the lift, the entire carriage 3 is made to slide on the guide way 4 until it is aligned practically laterally adjacent to one of the wheels R of the vehicle; once this position has been reached, the sliding of the carriage 3, or more precisely of the section 3*a* thereof, is locked by tightening the knob 15, and then the pawls 9 are released, so that the arms 5 and 6 can be rotated toward each other until they are parallel one another and arranged transversely so that one lies in front of the wheel R and the other one lies behind it, and are locked again in this configuration by engaging said pawls 9 in the other holes F provided for this purpose.

In order to clamp the wheel precisely, adapting to its diameter, one then acts on the block 13, releasing the mutual sliding of the sections 3*a* and 3*b* : when the arms 5 and 6 reach contact with the wheel R, the block 13 is released and said wheel is finally retained transversely by said arms.

When an operator has to move the vehicle along the guide ways, he activates the actuator 11, which by retracting or extracting the stem 11*a* pulls or pushes the section 3*b* of the carriage 3, which by being rigidly connected to the section 3*a* by means of the bar 12 and the corresponding block 13, also entrains said section 3*a*, ultimately moving the arms 5 and 6 simultaneously.

Said arms transmit the motion to the wheel R through the contact facilitated by the freely rotating rollers 17, and the vehicle is thus moved forward or backward on the guides 2 without the manual intervention of the operator.

In practice it has been found that the described invention achieves the intended aim and objects.

The invention thus conceived is susceptible of numerous modifications and variations, all of which are within the scope of the appended claims; thus, for example, the bar 12 and the corresponding block 13 can be replaced with an additional hydraulic or pneumatic cylinder interposed between the sections 3*a* and 3*b* of the carriage 3.

All the details may further be replaced with other technically equivalent ones.

In practice, the materials used, as well as the shapes and the dimensions, may be any according to requirements without thereby abandoning the scope of the protection of the appended claims.

The disclosures in Italian Patent Application no. MO2001A000065, from which this application claims priority, are incorporated herein by reference.

What is claimed is:

1. In a vehicle lift provided with guide ways, a device for automatically moving a vehicle on wheels thereof along the lift guide ways, the device comprising: a guide that is fixable to at least one of the guide ways of the lift, longitudinally thereto; a pusher carriage composed of two contiguous sections which are operatively connected to each other for joint operation; carriage movement means for moving horizontally said pusher carriage on said guide; section movement means, arranged interposed between and operatively coupled to said sections of the pusher carriage, for actuating relative movement of said sections on said guide between mutually approached and spaced positions; and at least one clamping means that clamps at least one wheel of the vehicle in a pushing configuration.

2. The device of claim 1, wherein said clamping means are movable to an inactive configuration, into a position of non-interference with said guide ways.

3. The device of claim 1, wherein said clamping means are movable, in an inactive configuration that corresponds to a retracted position thereof.

4. The device of claim 1, wherein said damping means are constituted by two arms, which are articulated to said pusher carriage and rotate, with a scissors motion on a horizontal plane flush with an upper supporting surface of said guide way, from an active position, in which the arms are adjacent to at least one wheel, parallel one another and arranged transversely and above with respect to said wheel, to an inactive position, in which the arms are divaricated an aligned parallel to said wheel.

5. The device of claim 4, wherein said carriage movement means for moving said pusher carriage are constituted by at least one actuator, which has a body fixed to said guide and a stem rigidly coupled to a section of said carriage, said actuator being of any of hydraulic and pneumatic devices.

6. The device of claim 4, wherein said arms are each articulated to one of said sections of the carriage.

7. The device of claim 5, wherein said guide is fixable on one side of said one guide way of the guide ways of the lift.

8. The device of claim 7, wherein said guide is fixable on an outer side of said one guide way of the guide ways of the lift.

9. The device of claim 6, further comprising locking means for removably locking the arms in said active and inactive positions, provided between said arms and respective ones of said carriage sections.

10. The device of claim 9, wherein said locking means are constituted by at least two corresponding positioning holes funned in the respective carriage section, and by respective pawls, provided mounted at each of said arms, said pawls being elastically engageable and alternately in said holes.

11. The device of claim 9, wherein said section movement means for moving said carriage sections mutually closer and further apart are constituted by at least one bar which is rigidly coupled to a first one of said sections, parallel to said guide, and is directed toward and engages the second one of said sections so as to actuate said second section to perform a sliding movement with respect to said first section, and by a element for blocking said sliding movement which is mounted on said second section.

12. The device of claim 11, wherein said bar is provided with any of teeth and treads, said blocking element being of a choker adapted to engage with said threads or teeth.

13. The device of claim 5, wherein at least said section to which said actuator is fixed is provided with position locking means for locking thereof in position along said guide.

14. The device of claim 13, wherein said position locking means are constituted by a treaded hole and by at least one knob, said knob being engageable by screwing into said threaded hole that is formed correspondingly and transversely in said section of the carriage to which the actuator is fixed, to engage said guide by forced contact.

15. The device of claim 6, comprising freely rotating means supported at said arms for contact with said wheels.

16. The device of claim 15, wherein said freely rotating means are constituted by rollers, which are fitted coaxially on said arms so that longitudinal sliding thereof on said arms is locked.

17. In a vehicle lift provided with guide ways, a device for automatically moving a vehicle on wheels thereof along the lift guide ways, the device comprising: a guide that is fixable to at least one of the guide ways of the lift, longitudinally thereto; a pusher carriage composed of two contiguous sections which are operatively connected to each other for joint operation; carriage movement means for moving horizontally said pusher carriage on said guide; section movement means, arranged interposed between and operatively coupled to said sections of the pusher carriage, for actuating said two sections to move on said guide between approached ad spaced positions; at least one clamping means that clamps at least one wheel of the vehicle in a pushing configuration; and position locking means provided at a first one of said sections for locking thereof in position along said guide.

18. The device of claim 17, wherein said position locking means are constituted by a threaded hole and by at least one knob, said knob being engageable by screwing into said threaded hole that is formed correspondingly ad transversely in said section of the carriage to which the actuator is fixed, to engage said guide by forced contact.

19. The device of claim 17, wherein said section movement means for moving said carriage sections mutually closer and further apart are constituted by at least one bar which is rigidly coupled to said first one of said sections, parallel to said guide, and is directed toward and engages the second one of said sections so as to actuate for sliding movement said second section with respect to said first section, and by a element for blocking said sliding movement which is mounted on said second section.

20. In a vehicle lift provided with guide ways, a device for automatically moving a vehicle on wheels thereof along the lift guide ways, the device comprising: a guide that is fixable to at least one of the guide ways of the lift, longitudinally thereto; a pusher carriage composed of two contiguous sections which are operatively connected to each other for joint operation; carriage movement means for moving horizontally said pusher carriage on said guide; section movement means, arranged interposed between and operatively coupled to said sections of the pusher carriage, for actuating movement of said sections on said guide between approached and spaced positions, said section movement means being rigidly coupled at a first one of said two sections and engaging the second one of said two sections so as to actuate sliding movement of said second section with respect to said first section; and at least one clamping means that clamps at least one wheel with the second one of said sections positioned for the vehicle in a pushing configuration.

* * * * *